United States Patent
Alexander et al.

(10) Patent No.: US 10,459,223 B2
(45) Date of Patent: Oct. 29, 2019

(54) SYSTEMS, DEVICES, AND METHODS FOR VARIABLE LUMINANCE IN WEARABLE HEADS-UP DISPLAYS

(71) Applicant: NORTH INC., Kitchener (CA)

(72) Inventors: Stefan Alexander, Elmira (CA); Ken Wu, Burlington (CA); Vance R. Morrison, Kitchener (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 15/839,075

(22) Filed: Dec. 12, 2017

(65) Prior Publication Data

US 2018/0113305 A1    Apr. 26, 2018

Related U.S. Application Data

(63) Continuation of application No. 15/675,373, filed on Aug. 11, 2017.
(Continued)

(51) Int. Cl.
*G02B 27/01* (2006.01)
*G02B 27/02* (2006.01)
(Continued)

(52) U.S. Cl.
CPC .......... *G02B 27/01* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 3,408,133 A   10/1968  Lee
3,712,716 A    1/1973  Cornsweet et al.
(Continued)

FOREIGN PATENT DOCUMENTS

JP    61-198892 A    9/1986
JP    10-319240 A   12/1998
(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — Jennifer D. Carruth
(74) *Attorney, Agent, or Firm* — Thomas Mahon

(57) ABSTRACT

Systems, devices, and methods for laser projectors with variable luminance that are well-suited for use in a wearable heads-up display ("WHUD") are described. Such laser projectors include a laser light source(s) and a scan mirror(s) to generate an image in the field of view of a user, and a liquid crystal element between the light source(s) and the scan mirror(s) to adjust the luminance of the image. The liquid crystal element is on an optical path between the laser light source(s) and the scan mirror and is communicatively coupled to a controller that modulates an opacity of the liquid crystal element. The opacity of the liquid crystal element determines the luminance of the image and may be altered in response to different factors, such as ambient light. Particular applications of the laser projector systems, devices, and methods in a wearable heads-up display are described.

8 Claims, 7 Drawing Sheets

Related U.S. Application Data

(60) Provisional application No. 62/374,181, filed on Aug. 12, 2016.

(51) Int. Cl.
  *G02B 27/09* (2006.01)
  *H04N 9/31* (2006.01)
  *G02B 26/10* (2006.01)

(52) U.S. Cl.
  CPC ....... *G02B 27/026* (2013.01); *G02B 27/0922* (2013.01); *H04N 9/3129* (2013.01); *H04N 9/3182* (2013.01); *H04N 9/3194* (2013.01); *G02B 26/10* (2013.01); *G02B 2027/0118* (2013.01); *G02B 2027/0163* (2013.01); *G02B 2027/0178* (2013.01)

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 6,008,781 A | 12/1999 | Furness, III et al. | |
| 6,027,216 A | 2/2000 | Guyton et al. | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 | 9/2017 | Bailey et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0182487 A1* | 7/2012 | Konno ................. G02B 27/286 349/7 |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0325202 A1 | 11/2015 | Lake et al. | |
| 2015/0362734 A1 | 12/2015 | Moser et al. | |
| 2015/0378162 A1 | 12/2015 | Bailey et al. | |
| 2016/0033771 A1 | 2/2016 | Tremblay et al. | |
| 2016/0202081 A1 | 7/2016 | Debieuvre et al. | |
| 2016/0238845 A1 | 8/2016 | Alexander et al. | |
| 2016/0274365 A1 | 9/2016 | Bailey et al. | |
| 2016/0274758 A1 | 9/2016 | Bailey | |
| 2016/0327796 A1 | 11/2016 | Bailey et al. | |
| 2016/0327797 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |
| 2017/0097753 A1 | 4/2017 | Bailey et al. | |
| 2017/0115483 A1 | 4/2017 | Aleem et al. | |
| 2017/0153701 A1 | 6/2017 | Mahon et al. | |
| 2017/0205876 A1 | 7/2017 | Vidal et al. | |
| 2017/0212290 A1 | 7/2017 | Alexander et al. | |
| 2017/0212349 A1 | 7/2017 | Bailey et al. | |
| 2017/0219829 A1 | 8/2017 | Bailey | |
| 2017/0299956 A1 | 10/2017 | Holland et al. | |
| 2017/0343796 A1 | 11/2017 | Bailey et al. | |

(56) References Cited

U.S. PATENT DOCUMENTS

2017/0343797 A1    11/2017   Bailey et al.
2018/0007255 A1     1/2018   Tang

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.

Chellappan et al., "Laser-based display: a review," *Applied Optics*, vol. 49, No. 25 (2010), pp. 79-98.

Cui et al., "Diffraction from angular multiplexing slanted volume hologram gratings," *Optik*, vol. 116 (2005), pp. 118-122.

Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.

Curatu et al., "Projection-based head-mounted display with eye-tracking capabilities," *Proc. of SPIE*, vol. 5875 (2005), pp. 58750J-1-58750J-9.

Essex, "Tutorial on Optomechanical Beam Steering Mechanisms," College of Optical Sciences, University of Arizona, 2006, 8 pages.

Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.

Hainich et al., "Chapter 10: Near-Eye Displays," in: *Displays—Fundamentals & Applications*, 2011, pp. 439-503.

Hornstein et al., "Maradin's Micro-Minor—System Level Synchronization Notes," *SID 2012 Digest* (2012), pp. 981-984.

International Search Report and Written Opinion, dated Apr. 25, 2017, for International Application No. PCT/US2016/067246, 10 pages.

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Jun. 8, 2016, for International Application No. PCT/US2016/018293, 17 pages.

International Search Report and Written Opinion, dated Jun. 8, 2016, for International Application No. PCT/US2016/018298, 14 pages.

International Search Report and Written Opinion, dated Jun. 8, 2016, for International Application No. PCT/US2016/018299, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Itoh et al., "Interaction-free calibration for optical see-through head-mounted displays based on 3D eye localization," *2014 IEEE Symposium on 3D User Interfaces* (3DUI), (2014), pp. 75-82.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Kessler, "Optics of Near to Eye Displays (NEDs)," *Oasis 2013*, Tel Aviv, Israel, Feb. 19, 2013, 37 pages.

Kress et al., "A review of head-mounted displays (HMD) technologies and applications for consumer electronics," *Proc. of SPIE*, vol. 8720 (2013), pp. 87200A-1-87200A-13.

Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.

Kress, "Optical architectures for see-through wearable displays," *Bay Area—SID Seminar*, Bay Area, Apr. 30, 2014, 156 pages.

Levola, "7.1: Invited Paper: Novel Diffractive Optical Components for Near to Eye Displays," *SID Symposium Digest of Technical Papers*, vol. 37, No. 1 (2006), pp. 64-67.

Liao et al., "The Evolution of MEMS Displays," *IEEE Transcations on Industrial Electronics*, vol. 56, No. 4 (2009), pp. 1057-1065.

Lippert, "Chapter 6: Display Devices: RSD (Retinal Scanning Display)," in: *The Avionics Handbook*, 2001, 8 pages.

Majaranta et al., "Chapter 3: Eye-Tracking and Eye-Based Human-Computer Interaction," in *Advances in Physiological Computing*, 2014, pp. 39-65.

Merriam-Webster, "Radio Frequencies" retrieved from https://www.merriam-webster.com/table/collegiate/radiofre.htm, retrieved on Jul. 12, 2017, 2 pages.

Schowengerdt et al., "Sterioscopic retinal scanning laser display with integrated focus cues for ocular accommodation," *Proc. of SPIE-IS& T Electronic Imaging*, vol. 5291 (2004), pp. 366-376.

Silverman et al., "58.5L: Late-News Paper: Engineering a Retinal Scanning Laser Display with Integrated Accommodative Depth Cues," *SID 03 Digest*, (2003), pp. 1538-1541.

Takatsuka et al., "Retinal projection display usin diffractive optical element," *Tenth International Conference on Intelligent Information Hiding and Multimedia Signal Processing*, IEEE, (2014), pp. 403-406.

Urey et al., "Optical performance requirements for MEMS-scanner based microdisplays," *Conf. on MOEMS and Miniaturized Systems*, SPIE, vol. 4178 (2000), pp. 176-185.

Urey, "Diffractive exit-pupil expander for display applications," *Applied Optics*, vol. 40, No. 32 (2001), pp. 5840-5851.

Viirre et al., "The Virtual Retina Display: A New Technology for Virtual Reality and Augmented Vision in Medicine," *Proc. of Medicine Meets Virtual Reality* (1998), pp. 252-257.

\* cited by examiner

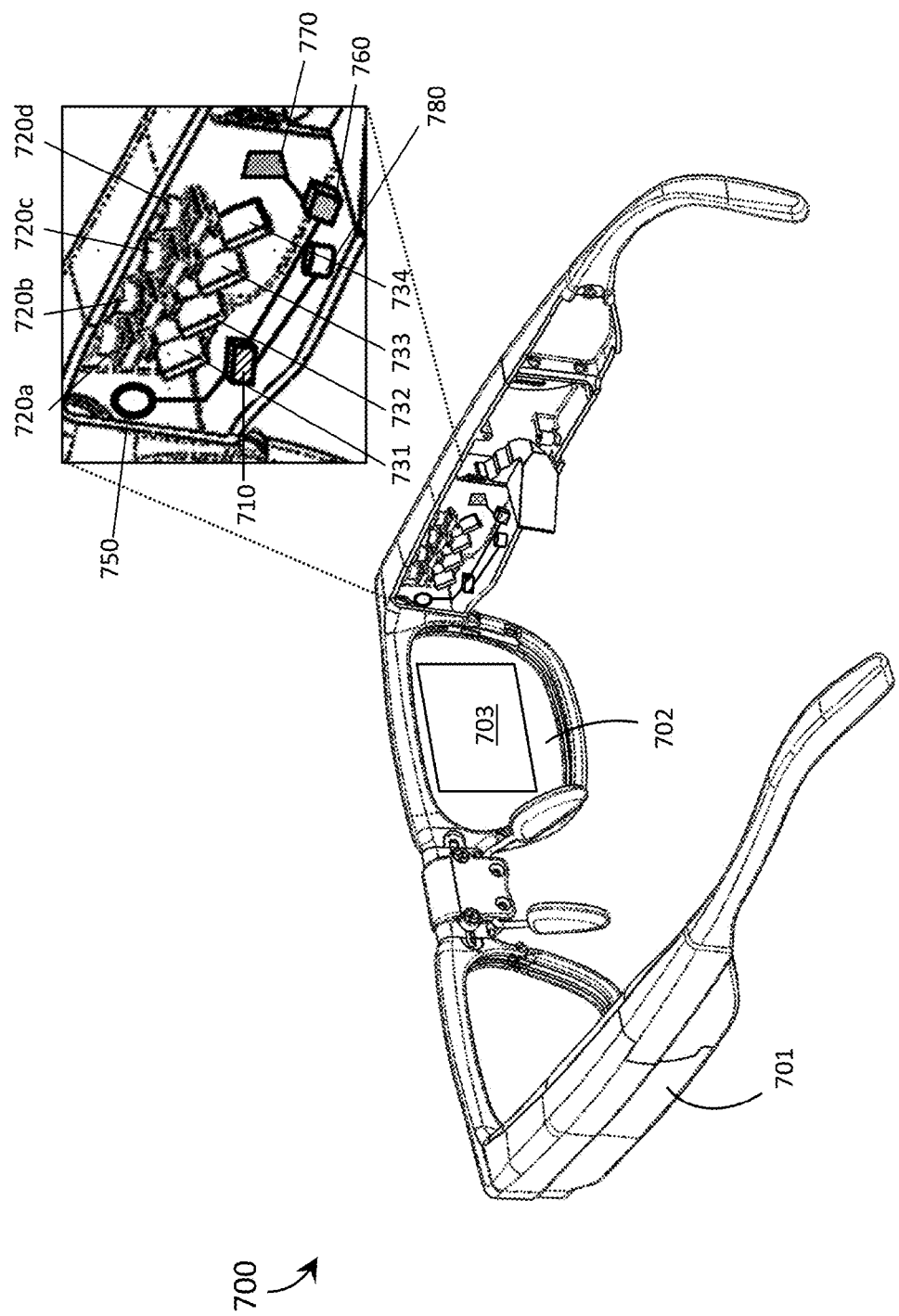

SYSTEMS, DEVICES, AND METHODS FOR VARIABLE LUMINANCE IN WEARABLE HEADS-UP DISPLAYS

TECHNICAL FIELD

The present systems, devices, methods, and articles generally relate to variable luminance in display systems, and particularly relate to variable luminance in laser projector-based wearable heads-up displays.

BACKGROUND

Description of the Related Art

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional scanning laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Wearable Heads-up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, are considerably bulkier and less stylish than conventional eyeglass frames.

Display Luminance

An important component of portable devices (e.g. smartphones, tablets) is the brightness of the display. A display that is too dim is difficult to discern in bright ambient conditions, such as outdoors in sunlight, and a display that is too bright can be uncomfortable for a user in darker ambient conditions.

BRIEF SUMMARY

Applicant has recognized that controlling brightness is especially important when the display is not opaque, as in a wearable heads-up display. When referring to a display, brightness is the intensity of light perceived by the user, often in relation to the ambient light, while luminance is the objective measurement of light intensity output by the display. One issue for heads up displays is decreasing the luminance of a display (e.g., in order to conserve battery power and/or to accommodate low-light ambient conditions) without decreasing overall display content quality. There is a need in the art for a display system with the ability to adapt display luminance without sacrificing content quality, particularly one well-suited for use in a wearable heads-up display.

A laser projector with variable luminance may be summarized as including: at least one laser diode to provide a laser light; at least one scan mirror positioned to receive the laser light from the at least one laser diode and controllably orientable to redirect the laser light over a range of angles; a liquid crystal element positioned in an optical path of the laser light between the at least one laser diode and the at least one scan mirror; and a controller communicatively coupled to the liquid crystal element, wherein an opacity of the liquid crystal element is modulatable in response to signals from the controller. The at least one laser diode of the laser projector may include a red laser diode to provide a red laser light, a green laser diode to provide a green laser light, and a blue laser diode to provide a blue laser light; wherein the laser projector further includes a beam combiner positioned and oriented to combine the red laser light, the green laser light, and the blue laser light into a single aggregate beam; and the opacity of the liquid crystal element that is modulatable in response to signals from the controller is at least partially dependent on a wavelength of the laser light incident thereon. The at least one laser diode of the laser projector may further include an infrared laser diode to provide an infrared laser light wherein the beam combiner of the laser projector is further positioned and oriented to combine the infrared laser light into the single aggregate beam. The opacity of the liquid crystal element that is modulatable in response to signals from the controller may be modulatable with respect to the red laser light, the green laser light, and the blue laser light up to a first attenuation factor and modulatable with respect to the infrared laser light up to a second attenuation factor, the first attenuation factor being greater than the second attenuation factor.

The laser projector may include an ambient light sensor communicatively coupled to the controller, the ambient light sensor positioned and oriented to sense a luminance of light in an ambient environment and provide an ambient light luminance signal to the controller in response thereto. The laser projector may further include: a processor communicatively coupled to receive the ambient light luminance signal from the ambient light sensor and communicatively coupled to instruct the controller to modulate the liquid crystal element based on the ambient light luminance signal. The laser projector may also include: a photodetector positioned and oriented to sense a luminance of the laser light provided by the at least one laser diode and communicatively coupled to provide a laser light luminance signal in response thereto; a beam splitter positioned and oriented to direct a first portion of the laser light from the at least one laser diode along a first optical path towards the photodetector and a second portion of the laser light from the at least one laser diode along a second optical path through the liquid crystal element towards the scan mirror; and a processor communicatively coupled to receive the laser light luminance signal from the photodetector and communicatively coupled to instruct the controller to modulate the liquid crystal element based on the laser light luminance signal.

The laser projector may include at least one processor communicatively coupled to the controller; and a non-transitory processor-readable storage medium communicatively coupled to the processor, wherein the non-transitory processor-readable storage medium stores processor-executable instructions and/or data that, when executed by the processor, cause the processor to instruct the controller to modulate the liquid crystal element based on input from a user of the laser projector.

The laser projector may include a support structure that in use is worn on a head of the user, wherein the laser projector is carried by the support structure; and a transparent combiner carried by the support structure and positioned within a field of view of the user, the transparent combiner to direct the laser light from an output of the laser projector into the field of view of the user.

A method of operating a laser projector with variable luminance, wherein the laser projector includes at least one laser diode and a liquid crystal element with a controller communicatively coupled thereto, may be summarized as including: generating a laser light by the at least one laser diode; receiving the laser light from the at least one laser diode by the liquid crystal element; modulating an opacity of the liquid crystal element by the controller; and attenuating a luminance of the laser light by the opacity of the liquid crystal element. The at least one laser diode of the laser projector may include a red laser diode, a green laser diode, and a blue laser diode and the method of operating the laser projector may further include: generating a laser light by the at least one laser diode includes at least one of: generating a red laser light by the red laser diode, generating a green laser light by the green laser diode, and generating a blue laser light by the blue laser diode; modulating an opacity of the liquid crystal element by the controller includes modulating an opacity of the liquid crystal element with respect to the red laser light, the green laser light, and the blue laser light by the controller; and attenuating a luminance of the laser light by the opacity of the liquid crystal element includes applying at most a first attenuation factor to each of the red laser light, the green laser light, and the blue laser light by a first amount by the opacity of the liquid crystal element. The at least one laser diode may further include an infrared laser diode and the method of operating the laser projector may further include: generating a laser light by the at least one laser diode further includes generating an infrared laser light by the infrared laser diode; modulating an opacity of the liquid crystal element by the controller further includes modulating an opacity of the liquid crystal element with respect to the infrared light, and attenuating a luminance of laser light by the opacity of the liquid crystal element includes applying at most a second attenuation factor to the infrared light by the opacity of the liquid crystal element, wherein, the first attenuation factor is greater than the second attenuation factor.

The laser projector may further include an ambient light sensor communicatively coupled to the controller, and the method of operating the laser projector may further include: sensing a luminance of an ambient light by the ambient light sensor; outputting an ambient light luminance signal by the ambient light sensor based on the luminance of the ambient light sensed by the ambient light sensor; and receiving the ambient light luminance signal by the controller; and modulating an opacity of the liquid crystal element by the controller may further include modulating the opacity of the liquid crystal element by the controller based on the ambient light luminance signal. The laser projector may further include a processor communicatively coupled between the ambient light sensor and the controller, and the method may further include: receiving the ambient light luminance signal by the controller and modulating the opacity of the liquid crystal element by the controller based on the ambient light luminance signal includes receiving the ambient light luminance signal from the ambient light sensor by the processor and instructing the controller to modulate the opacity of the liquid crystal element by the processor based on the ambient light luminance signal. The laser projector may also include a photodetector, a beam splitter and a processor communicatively coupled between the photodetector and the controller, and the method may further include: directing at least a portion of the laser light generated by the at least one laser diode along an optical path towards the photodetector; detecting a luminance of the at least a portion of the laser light by the photodetector; outputting a laser light luminance signal by the photodetector; and receiving the laser light luminance signal from the photodetector by the processor, and modulating the opacity of the liquid crystal element by the controller based on the ambient light luminance signal may further include instructing the controller to modulate the opacity of the liquid crystal element by the processor based on both the ambient light luminance signal and the laser light luminance signal.

The laser projector may further include at least one processor communicatively coupled to the controller and a non-transitory processor-readable storage medium communicatively coupled to the processor, wherein the non-transitory processor-readable storage medium stores processor-executable data and/or instructions, and the method may further include: receiving, by the processor, an input from a user of the laser projector; and in response to receiving the input from the user of the laser projector, executing by the processor, the processor-executable data and/or instructions, and modulating an opacity of the liquid crystal element by the controller may further include modulating the opacity of the liquid crystal element by the controller in response to instructions from the processor based on executing by the processor, the processor-executable data and/or instructions stored in the non-transitory processor-readable storage medium.

A wearable heads-up display may be summarized as including: a support structure worn on the head of a user, a laser projector carried by the support structure, the laser projector comprising: at least one laser diode to provide a laser light; and at least one scan mirror positioned to receive the laser light from the at least one diode and controllably orientable to redirect the laser light over a range of angles; a liquid crystal element positioned in an optical path of the laser light between the at least one laser diode and the at least one scan mirror; a controller communicatively coupled to the liquid crystal element, wherein an opacity of the liquid crystal element is modulatable in response to signals from the controller; and a transparent combiner carried by the support structure and positioned within a field of view of the user, the transparent combiner to direct the laser light from an output of the laser projector into the field of view of the user. The at least one laser diode of the wearable heads-up display may include a red laser diode to provide a red laser light, a green laser diode to provide a green laser light, and a blue laser diode to provide a blue laser light; wherein the laser projector may further include a beam combiner to combine the red laser light, the green laser light, and the blue laser light into a single aggregate beam; and the opacity of the liquid crystal element that is modulatable in response to signals from the controller is at least partially dependent on a wavelength of laser light incident thereon. The at least one laser diode of the wearable heads-up display may further include an infrared laser diode to provide an infrared laser light, wherein the beam combiner of the laser projector is positioned and oriented to combine the infrared laser light into the single aggregate beam. The opacity of the liquid crystal element that is modulatable in response to signals from the controller is modulatable with respect to the red laser light, the green laser light, and the blue laser light up to a first attenuation factor and modulatable with respect to the infrared laser light up to a second attenuation factor, wherein the first attenuation factor greater than the second attenuation factor.

The wearable heads-up display may include an ambient light sensor communicatively coupled to the controller, the ambient light sensor positioned and oriented to sense a luminance of light in an ambient environment and communicatively coupled to provide an ambient light luminance signal to the controller in response thereto. The wearable heads-up display may further include a processor communicatively coupled to receive the ambient light luminance signal from the ambient light sensor and communicatively coupled to instruct the controller to modulate the liquid crystal element based on the ambient light luminance signal. The wearable heads-up display may also include a photodetector positioned and oriented to sense a luminance of the laser light provided by the at least one laser diode and communicatively coupled to provide a laser light luminance signal in response thereto; a beam splitter positioned and oriented to direct a first portion of the laser light from the at least one laser diode along a first optical path towards the photodetector and a second portion of the laser light from the at least one laser diode along a second optical path through the liquid crystal element towards the scan mirror; and a processor communicatively coupled to receive the laser light luminance signal from the photodetector and communicatively coupled to instruct the controller to modulate the liquid crystal element based on the laser light luminance signal.

The wearable heads-up display may include at least one processor communicatively coupled to the controller; and a non-transitory processor-readable storage medium communicatively coupled to the processor, wherein the non-transitory processor-readable storage medium stores processor-executable data and/or instructions that, when executed by the processor, cause the processor to instruct the controller to modulate the liquid crystal element based on input from a user of the laser projector.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 7 is a partial cutaway perspective view of a wearable heads-up display with a laser projector with variable luminance in accordance with the present systems, devices, and methods.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for display systems with variable luminance and are particularly well-suited for use in wearable heads-up display with laser projectors.

Figure 1:
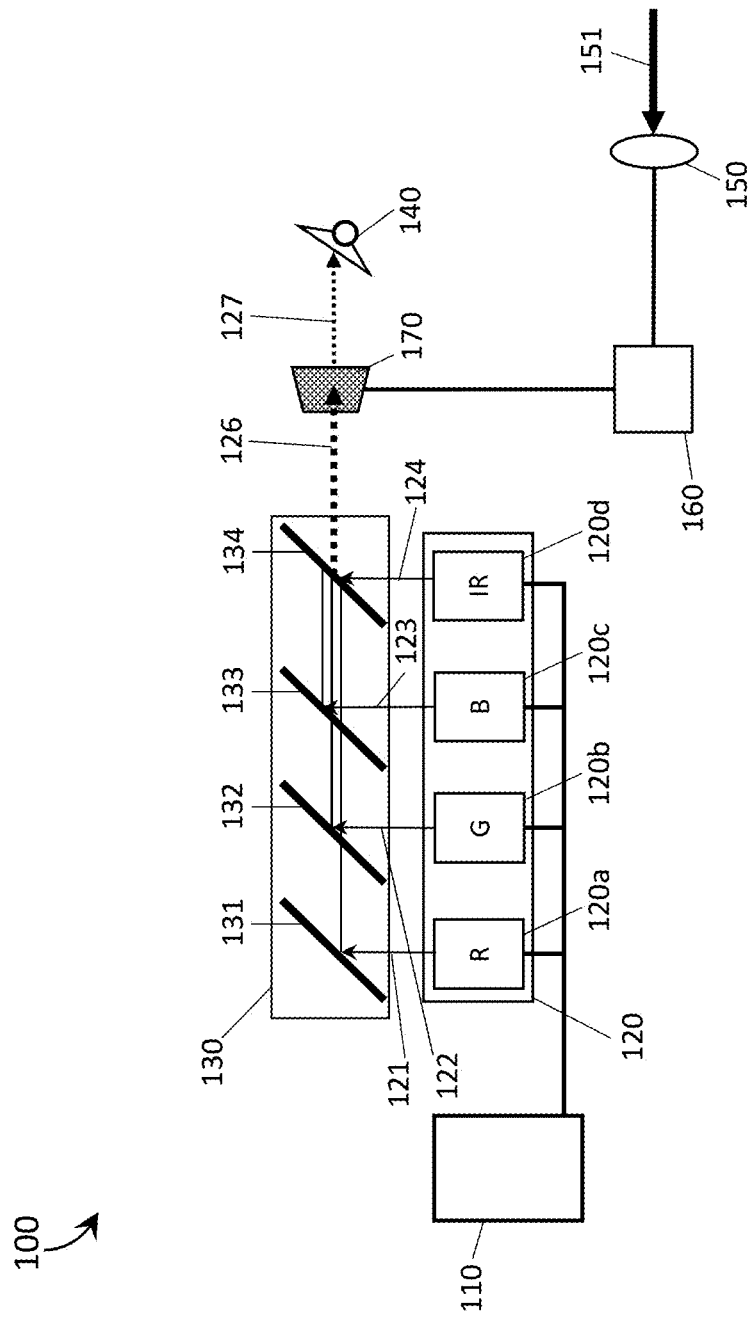
FIG. 1 is a schematic diagram of an exemplary laser projector with variable luminance in accordance with the present systems, devices, and methods.

FIG. 1 is a schematic diagram of an exemplary laser projector 100 with variable luminance in accordance with the present systems, devices, and methods. Laser projector 100 comprises a processor 110, four laser diodes 120a, 120b, 120c, 120d, (collectively 120) communicatively coupled to processor 110, a beam combiner 130, a scan mirror 140, an ambient light sensor 150, a controller 160 communicatively coupled to the ambient light sensor, and a liquid crystal element 170.

Liquid crystal is a substance that exists between a liquid and a solid state. The molecules of a solid substance are generally aligned while molecules in a liquid substance have no order. Molecules of a liquid crystal may have some order but it is not uniform over the entire substance. Under external stimulation, e.g. an electric or magnetic field, the molecules of a liquid crystal can become ordered, which can result in changes to the optical properties of the liquid crystal. This phenomenon provides a method of altering the opacity of a liquid crystal element. In most applications, liquid crystal is operated under one of two modes: a positive mode wherein a higher voltage results in a higher opacity, or a negative mode wherein a higher voltage results in a lower opacity. Throughout this specification, the liquid crystal is, in general, described as operating in a positive mode, however, in other implementations the liquid crystal could operate in a negative mode.

Throughout this specification and the appended claims, the term "processor" is often used. Generally, "processor" refers to hardware circuitry, in particular any of microprocessors, microcontrollers, application specific integrated circuits (ASICs), digital signal processors (DSPs), programmable gate arrays (PGAs), and/or programmable logic controllers (PLCs), or any other integrated or non-integrated circuit that perform logic operations.

Throughout this specification and the appended claims, the terms "electrical coupling" and "communicative coupling" (and variants, such as "electrically coupled" and "communicatively coupled") are often used. Generally, "electrical coupling" refers to any engineered arrangement for transferring electrical signals between one or more electrical signal carrier(s) (e.g., conductor(s) or semiconductor(s)) and includes without limitation galvanic coupling, inductive coupling, magnetic coupling, and/or capacitive coupling for the purpose of transferring, for example, electrical data signals, electrical information, and/or electrical power. Electrical coupling is a form of communicative coupling. "Communicative coupling" refers to any engineered arrangement for transferring signals (e.g., electrical or otherwise) for the purpose of transferring data, information, and/or power and includes, at least, electrical coupling (e.g., via electrically conductive wires, electrically conductive traces), magnetic coupling (e.g., via magnetic media), and/or optical coupling (e.g., via optical fiber).

Exemplary laser projector 100 with variable luminance operates as follows. Processor 110 modulates light output from laser diodes 120, which consist of a first red laser diode 120a (R), a second green laser diode 120b (G), a third blue laser diode 120c (B), and a fourth infrared laser diode 120d (IR). First laser diode 120a emits a first (e.g., red) light signal 121, second laser diode 120b emits a second (e.g., green) light signal 122, third laser diode 120c emits a third (e.g., blue) light signal 123, and fourth laser diode 120d emits a fourth (e.g., infrared) light signal 124. All four of light signals 121, 122, 123, and 124 enter or impinge on beam combiner 130 comprising optical elements 131, 132, 133, and 134. First light signal 121 is emitted towards first optical element 131 and reflected by first optical element 131 of beam combiner 130 towards second optical element 132 of beam combiner 130. Second light signal 122 is also directed towards second optical element 132. Second optical element 132 is formed of a dichroic material that is transmissive of the red wavelength of first light signal 121 and reflective of the green wavelength of second light signal 122; therefore, second optical element 132 transmits first light signal 121 and reflects second light signal 122. Second optical element 132 combines first light signal 121 and second light signal 122 into a single aggregate beam (shown as separate beams for illustrative purposes) and routes the aggregate beam towards third optical element 133 of beam combiner 130. Third light signal 123 is also routed towards third optical element 133. Third optical element 133 is formed of a dichroic material that is transmissive of the wavelengths of light (e.g., red and green) in the aggregate beam comprising first light signal 121 and second light signal 122 and reflective of the blue wavelength of third light signal 123. Accordingly, third optical element 133 transmits the aggregate beam comprising first light signal 121 and second light signal 122 and reflects third light signal 123. In this way, third optical element 133 adds third light signal 123 to the aggregate beam such that the aggregate beam comprises light signals 121, 122, and 123 (shown as separate beams for illustrative purposes) and routes the aggregate beam towards fourth optical element 134 in beam combiner 130. Fourth light signal 124 is also routed towards fourth optical element 134. Fourth optical element 134 is formed of a dichroic material that is transmissive of the visible wavelengths of light (e.g., red, green, and blue) in the aggregate beam comprising first light signal 121, second light signal 122, and third light signal 123 and reflective of the infrared wavelength of fourth light signal 124. Accordingly, fourth optical element 134 transmits the aggregate beam comprising first light signal 121, second light signal 122, and third light signal 123 and reflects fourth light signal 124. In this way, fourth optical element 134 adds fourth light signal 124 to the aggregate beam such that the aggregate beam 126 comprises portions of light signals 121, 122, 123, and 124. Fourth optical element 124 routes aggregate beam 126 towards liquid crystal element 170. Beam 126 passes through liquid crystal element 170 towards scan mirror 140 as the beam 127. Scan mirror 140 is controllably orientable and scans (e.g. raster scans) the beam to an eye of the user. The visible light may create display content in the field of view of a user, and the infrared light may illuminate the eye of the user for the purpose of eye tracking.

Ambient light sensor 150 senses ambient light 151 and outputs a signal representative of ambient light luminance. Controller 160 receives the ambient light luminance signal from ambient light sensor 150 and outputs a signal based on the value of the ambient light luminance signal. Liquid crystal element 170 is coupled to controller 160 and the opacity of liquid crystal element 170 is modulatable in response to signals from controller 160. The signal from controller 160 may be an alterable property of an electric field, e.g. voltage, electric current, frequency, etc. For example, in FIG. 1, liquid crystal element 170 may be responsive to the voltage output of controller 160. That is, changes in the voltage output of controller 160 alter the opacity of liquid crystal element 170 to beam 126. The attenuation factor of the modulatable opacity of liquid crystal element 170 is dependent on the wavelength of laser light incident on liquid crystal element 170. That is, for a given modulated opacity of liquid crystal element 170, a wavelength or range of wavelengths may have a first attenuation factor and a different wavelength or range of wavelengths may have a second attenuation factor. For example, at the highest modulated opacity of liquid crystal element 170, a first visible laser light (e.g., red laser light, green laser light, and/or blue laser light) attenuation factor may result in up to 99% loss of such visible laser light luminance, while at the same opacity of liquid crystal element 170 a second infrared laser light attenuation factor may result in up to 20% loss of infrared laser light luminance. In this implementation, the attenuation factor of red laser light, green laser light, and/or blue laser light at a modulated opacity of liquid crystal element 170 is greater than the attenuation factor of infrared laser light at the same modulated opacity of liquid crystal element 170. In FIG. 1, liquid crystal element 170 is in a state that is only partially transmissive to visible light, but is largely transmissive to infrared laser light. The smaller size of transmitted beam 127 as compared to beam 126 is representative of the attenuation of the visible laser light. Examples of the operation of a liquid crystal element in response to ambient light are provided in FIGS. 2A and 2B.

Figure 2A:
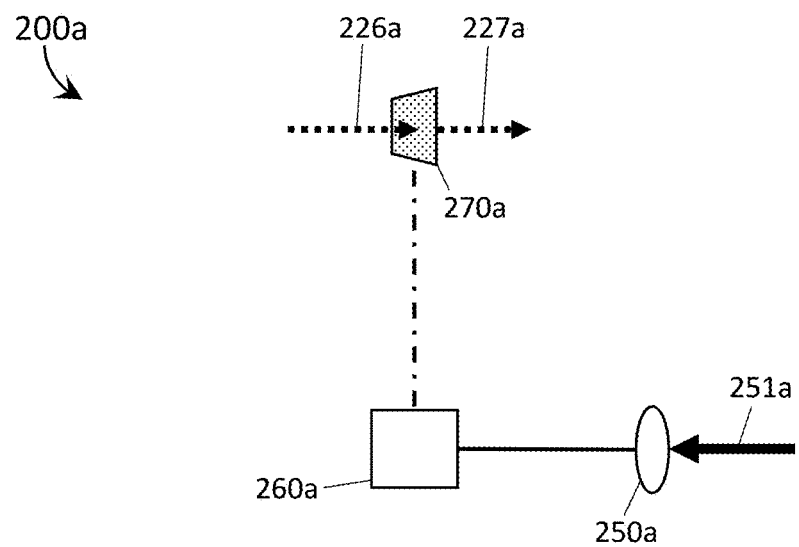
FIG. 2A is a schematic diagram of a luminance attenuator of a laser projector in operation in high luminance ambient light in accordance with the present systems, devices, and methods.
Figure 2B:
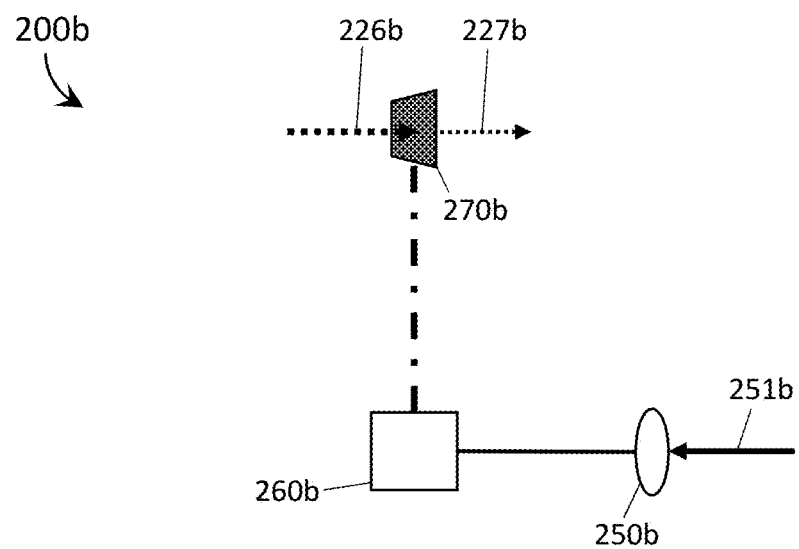
FIG. 2B is a schematic diagram of a luminance attenuator of a laser projector in operation in low luminance ambient light in accordance with the present systems, devices, and methods.

FIG. 2A is an illustrative diagram of a luminance attenuator 200a of a laser projector in operation in high luminance ambient light in accordance with the present systems, devices, and methods. Luminance attenuator 200a comprises an ambient light sensor 250a, a controller 260a communicatively coupled to ambient light sensor 250a, and a modulatable liquid crystal element 270a electrically coupled to controller 260a. Ambient light sensor 250a senses ambient light 251a and outputs a signal representative of ambient light 251a luminance. Controller 260a receives the ambient light luminance signal and outputs a signal based on the value of the ambient light luminance signal. The opacity of liquid crystal element 270a is responsive to signals from controller 260a. In FIG. 2A and 2B the opacity of the liquid crystal element is directly responsive to voltage output by controller 260a, i.e., a lower voltage output results in lower opacity and a higher voltage output results in a higher opacity (or vice versa if the liquid crystal is operating in negative mode). A person of skill in the art will appreciate that the opacity of the liquid crystal element may respond to a change in an electric field property, e.g. voltage, current, frequency, etc., or may respond to other stimuli. A laser light signal 226a is incident on liquid crystal element 270a and is transmitted by liquid crystal element 270a as laser light signal 227a. In FIG. 2A ambient light 251a incident on ambient light sensor 250a has a high luminance (e.g. bright sunlight). Therefore, the display needs to have a high luminance to be visible to a user. Ambient light sensor 250a senses ambient light 251a and outputs a signal representative of the high luminance. Controller 260a receives the ambient light luminance signal from ambient light sensor 250a and adjusts or maintains the voltage output in response to the high luminance ambient light. The voltage output from controller 260a is set to alter to or maintain a low opacity state of liquid crystal element 270a, represented by light shading of liquid crystal element 270a. Laser light 226a is transmitted through liquid crystal element 270a as laser light 227a, shown as identical arrows to represent minimal to no loss of luminance. Laser light 227a is comfortably visible to a user in the ambient light conditions of FIG. 2A.

FIG. 2B is a schematic diagram of a luminance attenuator 200b of a laser projector in operation in low luminance ambient light in accordance with the present systems, devices, and methods. Luminance attenuator 200b comprises an ambient light sensor 250b, a controller 260b communicatively coupled to ambient light sensor 250b, and a modulatable liquid crystal element 270b electrically coupled to controller 260b. Ambient light sensor 250b senses the ambient light 251b and outputs a signal representative of ambient light luminance. Controller 260b receives the ambient light luminance signal and outputs a signal based on the value of the ambient light luminance signal. The opacity of liquid crystal element 270b is responsive to signals from controller 260b. In FIGS. 2A and 2B the liquid crystal element opacity is directly responsive to the voltage output by controller 260b, i.e., a lower voltage output results in lower opacity and a higher voltage output results in a higher opacity. A person of skill in the art will appreciate that the opacity of the liquid crystal element may respond to a change in an electric field property, e.g. voltage, current, frequency, etc., or may respond to other stimuli. A laser light signal 226b is incident on liquid crystal element 270b and is transmitted by liquid crystal element 270b as laser light signal 227b. In FIG. 2B ambient light 251b incident on ambient light sensor 250b has a low luminance (e.g. a dark room, outside at night). Therefore, the display needs to have a low luminance to be comfortably visible to a user. Ambient light sensor 250b senses ambient light 251b and outputs a signal representative of the low luminance. Controller 260b receives the ambient light luminance signal from ambient light sensor 250b and adjusts or maintains the voltage output in response to the low luminance ambient light. The voltage output from controller 260b is high to alter to or maintain a high opacity state of liquid crystal element 270b, represented by dark shading of liquid crystal element 270b. Laser light 226b is transmitted through liquid crystal element 270b as laser light 227b, shown as a smaller arrow to represent attenuation. In an implementation with visible and infrared light, as in FIG. 1, liquid crystal element 270b has a greater attenuation factor for visible light than for infrared light. Laser light 227b is comfortably visible to a user in the ambient light conditions of FIG. 2B.

FIGS. 2A and 2B are exemplary illustrations of a controller and a liquid crystal element in operation to adjust luminance in response to ambient light. A person of skill in the art will appreciate that the controller and the liquid crystal element may adjust luminance in response to any number of other factors, exclusively or in combination, such as user input or specific display content. An example of a laser projector with variable luminance responsive to several factors is provided in FIG. 3.

Figure 3:
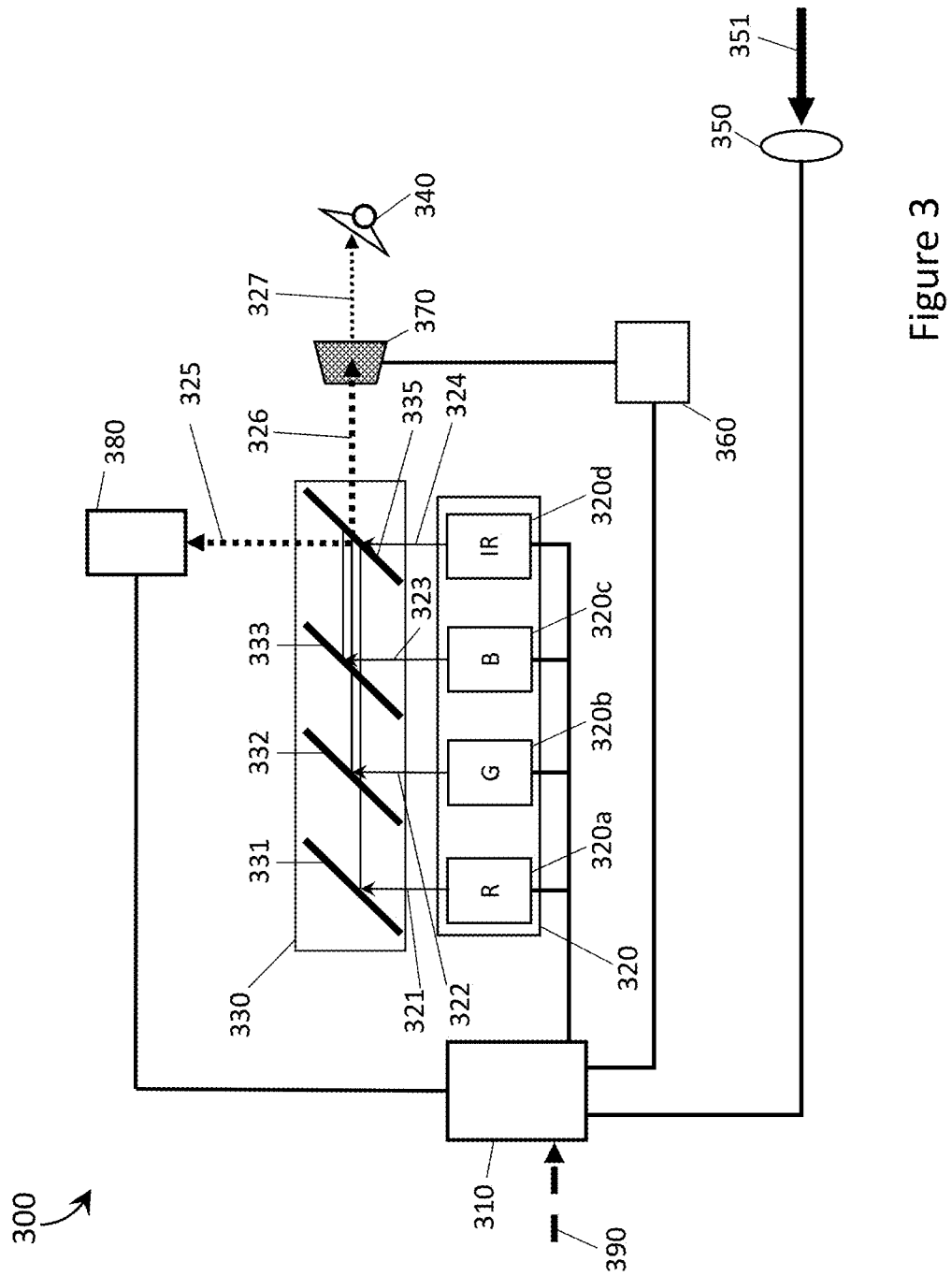
FIG. 3 is a schematic diagram of an exemplary laser projector with variable luminance in accordance with the present systems, devices, and methods.

FIG. 3 is a schematic diagram of an exemplary laser projector 300 with variable luminance in accordance with the present systems, devices, and methods. Laser projector 300 comprises a processor 310, four laser diodes 320a, 320b, 320c, and 320d (collectively 320) communicatively coupled to processor 310, a beam combiner 330, a scan mirror 340, an ambient light sensor 350 communicatively coupled to processor 310, a controller 360 communicatively coupled to processor 310, a liquid crystal element 370 communicatively coupled to controller 360, and a photodetector 380 communicatively coupled to processor 310. A person of skill in the art will appreciate that more than one processor may be used.

Exemplary laser projector 300 operates as follows. Processor 310 controls display content by modulating light output from laser diodes 320, which consist of a first red laser diode 320a (R), a second green laser diode 320b (G), a third blue laser diode 320c (B), and a fourth infrared laser diode 320d (IR). First laser diode 320a emits a first (e.g., red) light signal 321, second laser diode 320b emits a second (e.g., green) light signal 322, third laser diode 320c emits a third (e.g., blue) light signal 323, and fourth laser diode 320d emits a fourth (e.g., infrared) light signal 324. All four of light signals 321, 322, 323, and 324 enter or impinge on beam combiner 330 comprising optical elements 331, 332, 333, and 334. First light signal 321 is emitted towards first optical element 331 and reflected by first optical element 331 of beam combiner 330 towards second optical element 332 of beam combiner 330. Second light signal 322 is also directed towards second optical element 332. Second optical element 332 is formed of a dichroic material that is transmissive of the red wavelength of first light signal 321 and reflective of the green wavelength of second light signal 322; therefore, second optical element 332 transmits first light signal 321 and reflects second light signal 322. Second optical element 332 combines first light signal 321 and second light signal 322 into a single aggregate beam (shown as separate beams for illustrative purposes) and routes the aggregate beam towards third optical element 333 of beam combiner 330. Third light signal 323 is also routed towards third optical element 333. Third optical element 333 is formed of a dichroic material that is transmissive of the wavelengths of light (e.g., red and green) in the aggregate beam comprising first light signal 321 and second light signal 322 and reflective of the blue wavelength of third light signal 323. Accordingly, third optical element 333 transmits the aggregate beam comprising first light signal 321 and second light signal 322 and reflects third light signal 323. In this way, third optical element 333 adds third light signal 323 to the aggregate beam such that the aggregate beam comprises light signals 321, 322, and 323 (shown as separate beams for illustrative purposes) and routes the aggregate beam towards fourth optical element 334 in beam combiner 330. Fourth light signal 324 is also routed towards fourth optical element 334. Fourth optical element 334 is formed of a dichroic material that is partially transmissive of the visible wavelengths of light (e.g., red, green, and blue) in the aggregate beam comprising first light signal 321, second light signal 322, and third light signal 323 and partially reflective of the infrared wavelength of fourth light signal 324. Accordingly, fourth optical element 334 partially transmits the aggregate beam comprising first light signal 321, second light signal 322, and third light signal 323 and partially reflects fourth light signal 324. In this way, fourth optical element 334 adds fourth light signal 324 to the aggregate beam such that the aggregate beam 326 comprises portions of light signals 321, 322, 323, and 324. Fourth optical element 324 routes aggregate beam 326 through liquid crystal element 370 towards scan mirror 340 as beam 327. Scan mirror 340 scans (e.g. raster scans) beam 327 to a field of view of the user or to an eye of the user. The visible light may create display content in the field of view of a user, and the infrared light may illuminate the eye of the user for the purpose of eye tracking. A person of skill in the art will appreciate that the visible and infrared light may take different paths before or beyond the scan mirror. A person of skill in the art will also appreciate that methods other than a scan mirror, such as beam steering and/or one or more digital light processor(s), can be employed to create display content or to direct the infrared light.

In the exemplary implementation of projector 300, fourth optical element 334 is a dual-purpose optical component. In addition to functioning as the last optical combining element in optical combiner 330 (i.e., by combining fourth, infrared laser light 324 with the red, green, and blue laser lights 321, 322, and 323, respectively), fourth optical element 334 also functions as a beam splitter in projector 300. To this end, fourth optical element 334 is positioned and oriented to direct a first portion 325 of the aggregate laser light (represented by a dashed arrow in FIG. 3) from laser diodes 320 (i.e., comprising first light 321, second light 322, third light 323, and fourth light 324) along a first optical path towards photodetector 380 and a second portion 326 of the aggregate laser light (also represented by a dashed arrow in FIG. 1) along a second optical path towards liquid crystal element 370. Photodetector 380 detects the luminance of beam 325 and outputs a representative laser light luminance signal to processor 310. In an implementation with multiple laser sources (e.g., multiple laser diodes 320), each emitting light of a different wavelength or a different range of wavelengths (e.g., laser light signals 321, 322, 323, and 324), photodetector 380 is responsive to light within one or more waveband(s) that, in total (e.g., collectively in combination) includes all of the emitted wavelengths. The laser light luminance signal may be used to more accurately measure a luminance of light exiting beam combiner 330 than the luminance indicated by the processor during laser diode modulation. That is, light emitted from the laser diodes is modulated by the processor to be a specific luminance, however, the path of light through beam combiner 330 may less than 100% optically efficient and loss of light/luminance may occur.

Ambient light sensor 350 senses ambient light 351 and outputs a signal representative of ambient light luminance to processor 310.

Processor 310 receives the ambient light luminance signal and the laser light luminance signal and instructs controller 360 to modulate an opacity of liquid crystal element 370 based on the ambient light luminance signal, the laser light luminance signal, and/or the specific display content created by the laser projector. Processor 310 may also receive instructions 390 from a user to manually adjust the luminance of display content. Following receipt of luminance signals and/or user input, the processor may execute processor-executable instructions and/or data from a non-transitory processor-readable storage medium to instruct controller 360 to modulate an opacity of liquid crystal element 370. A person of skill in the art will appreciate that additional factors may influence the modulation of the liquid crystal element, including but not limited to: altering the polarization of laser light, altering the red-green-blue mix of display content, or altering the color temperature of display content.

In FIG. 3, liquid crystal element 370 is electrically coupled to controller 360 and responds to signals from controller 360 in the form of changes in voltage output. The liquid crystal element opacity is directly responsive to voltage output by controller 360, i.e., a lower voltage output results in lower opacity and a higher voltage output results in a higher opacity. A person of skill in the art will appreciate that the opacity of the liquid crystal element may respond to a change in an electric field property, e.g. voltage, current, frequency, etc., or may respond to other stimuli. In FIG. 3, liquid crystal element 370 is in a state of high opacity, as represented by larger beam 326 and smaller transmitted beam 327. As in FIG. 1, the attenuation factor of the liquid crystal element is greater for visible light than for infrared light.

Figure 4:
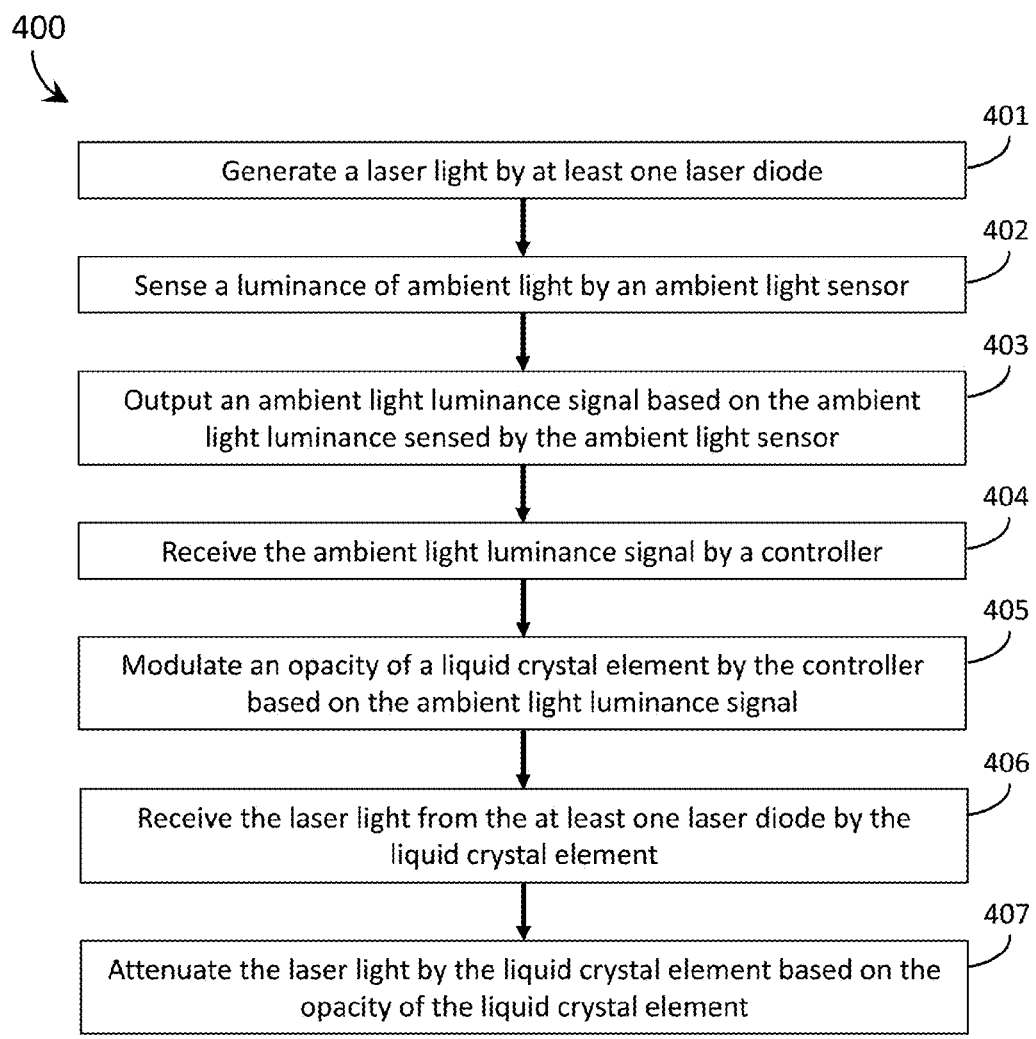
FIG. 4 shows a method of operating a laser projector with variable luminance in accordance with the present systems, devices, and methods.

FIG. 4 shows a method 400 of operating a laser projector with variable luminance in accordance with the present systems, devices, and methods. The laser projector may be substantially similar to laser projector 100 and generally includes at least one laser diode, an ambient light sensor, a controller communicatively coupled to the ambient light sensor, and a liquid crystal element communicatively coupled to the controller. Method 400 includes seven acts 401, 402, 403, 404, 405, 406, and 407, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 401, the at least one laser diode generates a laser light. The laser diodes may be communicatively coupled to a processor which modulates the generation of the laser light by the at least one laser diode.

At 402, an ambient light sensor senses the luminance of ambient light incident on the sensor.

At 403, the ambient light sensor outputs a signal representative of the luminance of the ambient light. The ambient light sensor outputs a signal with a value that is indicative of the luminance of the light sensed by the ambient light sensor.

At 404, the controller receives the ambient light luminance signal from the ambient light sensor.

At 405, the controller modulates an opacity of a liquid crystal element based on the ambient light luminance signal. The opacity of the liquid crystal element is responsive to a signal output by the controller based on the value of the ambient light luminance signal. For example, the controller may generate an electric field and the signal output by the controller may be an alterable property of the field that is varied based on the received ambient light luminance signal. That is, a property of the electric field, e.g. the voltage output, may be increased or decreased based on the value of the ambient light luminance signal received by the controller from the ambient light sensor. An increase in voltage output may increase the opacity of the liquid crystal element and a decrease in voltage output may decrease the opacity of the liquid crystal element. A person of skill in the art will appreciate that the controller may vary a different property of an electric field or may employ a different stimulus altogether.

At 406, the laser light from the at least one laser diode is received by the liquid crystal element. That is, at least a portion of the laser light has followed an optical path through the laser projector and is incident on the liquid crystal element.

At 407, the laser light is attenuated by the liquid crystal element in response to the modulated opacity of the liquid crystal element. The altered opacity of the liquid crystal element results in altered transmission of light through the liquid crystal element and, therefore, altered luminance of the display. In an implementation where the at least one laser diode includes a red laser diode, a green laser diode, a blue laser diode, and an infrared laser diode, as in FIGS. 1 and 3, the attenuation factor of the liquid crystal element for the visible laser light is greater than the attenuation factor of the liquid crystal element for infrared light.

A person of skill in the art will appreciate that in other implementations different or additional factors may influence the modulation of the liquid crystal element, including but not limited to: altering the polarization of laser light, altering the red-green-blue mix of display content, or altering the color temperature of display content. Information/data about these factors may be received by a processor which then instructs the controller to modulate the liquid crystal element. An exemplary method of operating a laser projector with variable luminance with a processor is provided in FIG. 5.

Figure 5:
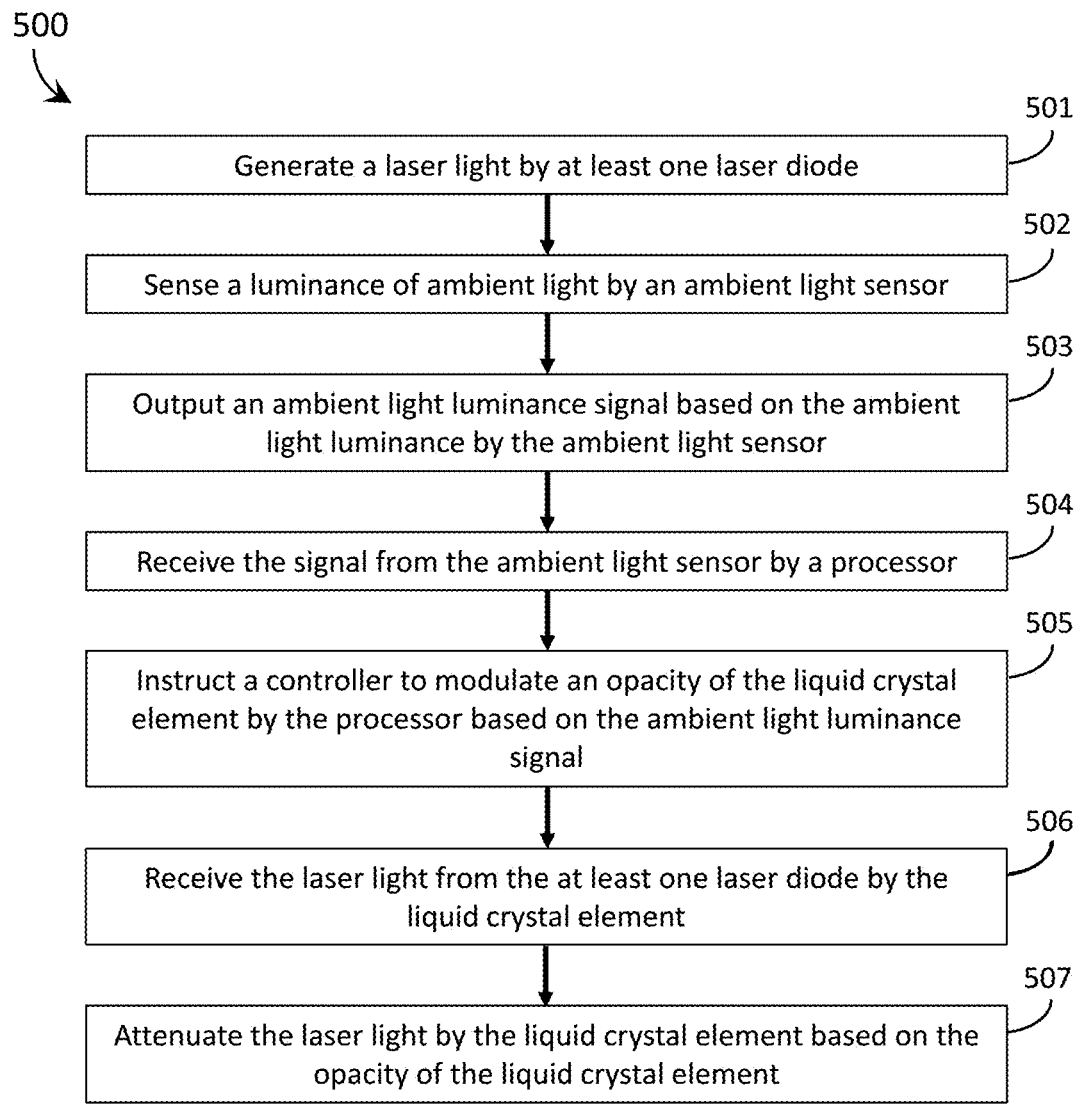
FIG. 5 shows a method of operating a laser projector with variable luminance in accordance with the present systems, devices, and methods.

FIG. 5 shows a method 500 of operating a laser projector with variable luminance in accordance with the present systems, devices, and methods. The laser projector may be substantially similar to laser projector 300 and generally includes at least one laser diode, an ambient light sensor, a processor communicatively coupled to the ambient light sensor, a controller communicatively coupled to the processor, and a liquid crystal element communicatively coupled to the controller. Method 500 includes seven acts 501, 502, 503, 504, 505, 506, and 507, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 501, the at least one laser diode generates a laser light. The generation of laser light by the at least one laser diode may be modulated by a processor. The processor may or may not be the same as the processor communicatively coupled to the ambient light sensor and the controller.

At 502, an ambient light sensor senses the luminance of ambient light incident on the sensor.

At 503, the ambient light sensor outputs a signal representative of the luminance of the ambient light. The ambient light sensor outputs a signal with a value that is indicative of the luminance of the light sensed by the ambient light sensor.

At 504, the processor receives the ambient light luminance signal from the ambient light sensor.

At 505, the processor instructs the controller to output a signal to modulate an opacity of the liquid crystal element based on the value of the ambient light luminance signal. For example, the controller may generate an electric field and the signal output by the controller may be a property of the electric field that is varied based on the received signal. That is, a property of the electric field, e.g. the voltage output, may be increased or decreased based on the instructions from the processor. The opacity of the liquid crystal element may increase or decrease in response to the signal output by the controller. An increase in voltage output may increase the opacity of the liquid crystal element, while a decrease in voltage output would decrease the opacity. A person of skill in the art will appreciate that the controller may vary a different property of an electric field or may use a different stimulus altogether.

At 506, the laser light from the at least one laser diode is received by the liquid crystal element. That is, at least a portion of the laser light has followed an optical path through the laser projector and is incident on the liquid crystal element.

At 507, the laser light is attenuated by the liquid crystal element in response to the modulated opacity of the liquid crystal element. The altered opacity of the liquid crystal element results in altered transmission of light through the liquid crystal element and, therefore, altered luminance of the display. In an implementation where the at least one laser diode includes a red laser diode, a green laser diode, a blue laser diode, and an infrared laser diode, as in FIGS. 1 and 3, the attenuation factor of the liquid crystal element for the visible laser light is greater than the attenuation factor of the liquid crystal element for infrared light.

A person of skill in the art will appreciate that in other implementations different or additional factors may influence the modulation of the liquid crystal element, including but not limited to: altering the polarization of laser light, altering the red-green-blue mix of display content, or altering the color temperature of display content. The laser projector may further include a beam splitter and a photodetector communicatively coupled to the processor to measure laser light luminance, as in FIG. 3, and the opacity of the liquid crystal element could be modulated based on both ambient light luminance and laser light luminance as measured by the photodetector. The opacity of the liquid crystal element may also be modulated based on user input. An exemplary method of operating a laser projector with variable luminance by user input is provided in FIG. 6.

Figure 6:
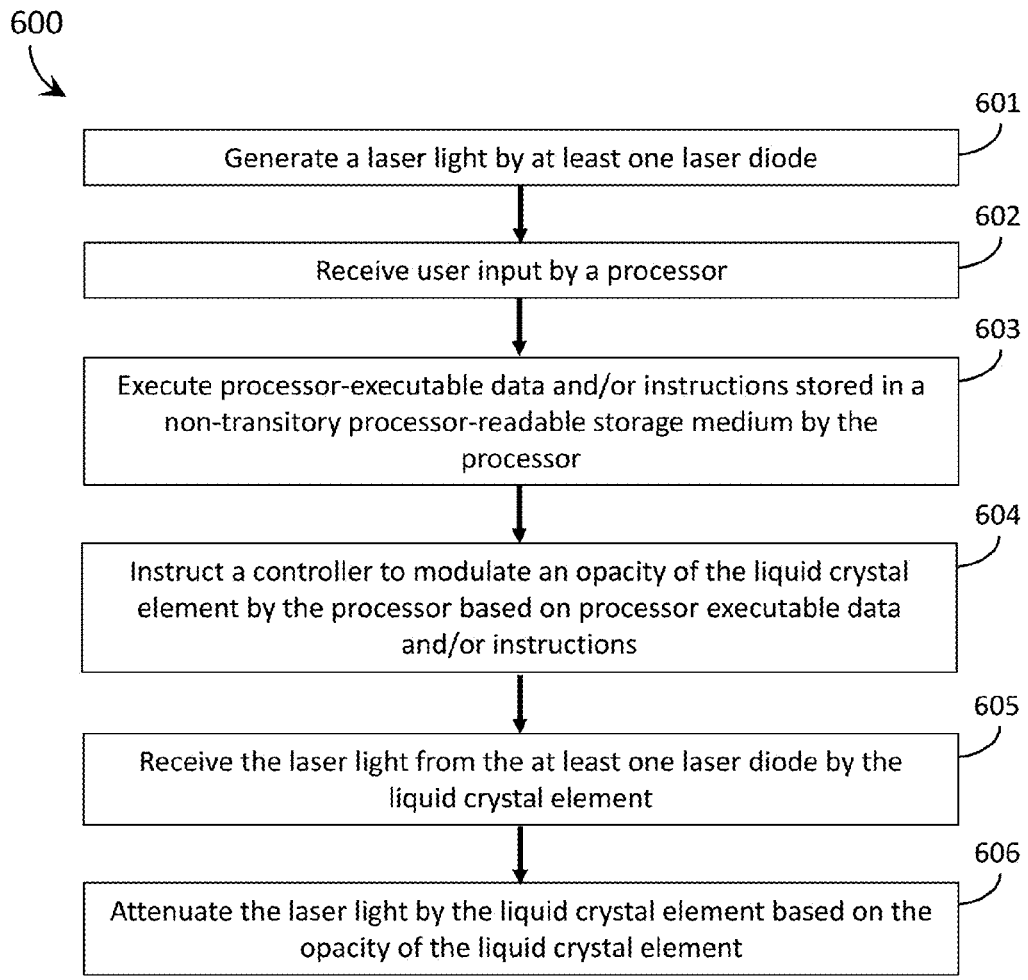
FIG. 6 shows a method of operating a laser projector with variable luminance with user input in accordance with the present systems, devices, and methods.

FIG. 6 shows a method 600 of operating a laser projector with variable luminance with user input in accordance with the present systems, devices, and methods. The laser projector may be substantially similar to laser projector 300 and generally includes at least one laser diode, a processor, a non-transitory processor-readable storage medium communicatively coupled to the processor, a controller communicatively coupled to the processor, and a liquid crystal element communicatively coupled to the controller. Method 600 includes six acts 601, 602, 603, 604, 605 and 606, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 601, the at least one laser diode generates a laser light. The generation of laser light by the diodes may be modulated by a processor. The processor may or may not be the same as the processor communicatively coupled to the photodetector and the controller.

At 602, the processor receives an input from the user. User input could be a direct input to alter display luminance or could be an indirect input, such as opening a software application which requires a specific display luminance.

At 603, the processor instructs the controller to output a signal by executing data and/or instructions stored in the non-transitory processor-readable storage medium based on the input from the user. The controller may generate an electric field and the signal may be a property of the field that is varied based on the user input. That is, a property of the electric field, e.g. the voltage output, may be increased or decreased in magnitude based on the user input received by the processor from the user. A person of skill in the art will appreciate that the controller may vary a different property of an electric field or may use a different stimulus altogether.

At 604, an opacity of the liquid crystal element is modulated in response to the signal from the controller. The opacity of the liquid crystal element may increase or decrease in response to the signal output by the controller. As in 603, where the signal from the controller was voltage output, an increase in voltage output may increase the opacity of the liquid crystal element, while a decrease in voltage output would decrease the opacity.

At 605, the laser light from the at least one laser diode is received by the liquid crystal element. That is, at least a portion of the laser light has followed an optical path through the laser projector and is incident on the liquid crystal element.

At 606, the laser light is attenuated by the liquid crystal element in response to the modulated opacity of the liquid crystal element. The altered opacity of the liquid crystal element results in altered transmission of light through the liquid crystal element and therefore the altered luminance of the display. In an implementation where the at least one laser diode includes a red laser diode, a green laser diode, a blue laser diode, and an infrared laser diode, as in FIGS. 1 and 3, the attenuation factor of the liquid crystal element for the visible laser light is greater than the attenuation factor of the liquid crystal element for infrared light.

A person of skill in the art will appreciate that in other implementations different or additional factors may influence the modulation of the liquid crystal element, including but not limited to: altering the polarization of laser light, altering the red-green-blue mix of display content, or altering the color temperature of display content. A person of skill in the art will also appreciate that in various implementations aspects of methods 400, 500, and 600 could be combined. For example, adjusting the attenuation of display luminance could be based on both ambient light luminance and user input, as well as laser light luminance.

FIG. 7 is a partial cutaway perspective view of a wearable heads-up display ("WHUD") 700 with a laser projector with variable luminance in accordance with the present systems, devices, and methods. WHUD 700 includes a support structure 701 that in use is worn on the head of a user and has a general shape and appearance of an eyeglasses frame. Support structure 701 carries multiple components, including: a lens 702, a transparent combiner 703, and a laser projector 704. Laser projector 730 (see magnified view thereof in box) is generally similar to laser projector 300 from FIG. 3 and includes a processor 710, laser diodes 720a, 720b, 720c, and 720d communicatively coupled to processor 710 (communicative coupling not shown to reduce clutter), optical elements 731, 732, and 733, beam combiner/splitter 734, a scan mirror (not shown), an ambient light sensor 750 communicatively coupled to processor 710, a controller 760 communicatively coupled to processor 710, a liquid crystal element 770 communicatively coupled to controller 760, and a photodetector 780 communicatively coupled to processor 710. Laser projector 704 operates in generally the same manner as laser projector 300 from FIG. 3.

Processor 710 controls display content by modulating light output from four laser diodes, which consist of a first red laser diode 720a, a second green laser diode 720b, a third blue laser diode 720c, and a fourth infrared laser diode 720d. First laser diode 720a emits a first (e.g., red) light signal, second laser diode 720b emits a second (e.g., green) light signal, third laser diode 720c emits a third (e.g., blue) light signal, and fourth laser diode 720d emits a fourth (e.g., infrared) light signal. All four light signals enter or impinge on a beam combiner comprising optical elements 731, 732, 733, and 734. The first light signal is emitted towards first optical element 731 and reflected by first optical element 731 towards second optical element 732. The second light signal is also directed towards second optical element 732. Second optical element 732 is formed of a dichroic material that is transmissive of the red wavelength of the first light signal and reflective of the green wavelength of the second light signal; therefore, second optical element 732 transmits the first light signal and reflects the second light signal. Second optical element 732 combines the first light signal and the second light signal 722 into a single aggregate beam and routes the aggregate beam towards third optical element 733. The third light signal is also routed towards third optical element 733. Third optical element 733 is formed of a dichroic material that is transmissive of the wavelengths of light (e.g., red and green) in the aggregate beam comprising the first light signal and the second light signal and reflective of the blue wavelength of the third light signal. Accordingly, third optical element 733 transmits the aggregate beam comprising the first light signal and the second light signal and reflects the third light signal. In this way, third optical element 733 adds the third light signal to the aggregate beam such that the aggregate beam comprises the three light signals and routes the aggregate beam towards fourth optical element 734. The fourth light signal is also routed towards fourth optical element 734. Fourth optical element 734 is formed of a dichroic material that is partially transmissive of the visible wavelengths of light (e.g., red, green, and blue) in the aggregate beam comprising the first light signal, the second light signal, and the third light signal and partially reflective of the infrared wavelength of the fourth light signal. Accordingly, fourth optical element 734 partially transmits the aggregate beam comprising the first light signal, the second light signal, and the third light signal and partially reflects the fourth light signal. In this way, fourth optical element 734 adds the fourth light signal to the transmitted aggregate beam such that the resulting aggregate beam comprises portions of all four light signals. Fourth optical element 734 routes the aggregate beam through liquid crystal element 770 towards the scan mirror. The scan mirror is controllably orientable and scans (e.g. raster scans) the beam to a field of view of the user. The visible light may create display content in the field of view of a user, and the infrared light may illuminate the eye of the user for the purpose of eye tracking.

In the exemplary implementation of WHUD 700, fourth optical element 734 is a dual-purpose optical component. In addition to functioning as the last optical combining element (i.e., by combining fourth, infrared laser light with the red, green, and blue laser lights), fourth optical element 734 also functions as a beam splitter in projector 700. To this end, fourth optical element 734 is positioned and oriented to direct a first portion of the aggregate laser light from laser diodes 720 along a first optical path towards photodetector 780 and a second portion of the aggregate laser light along a second optical path towards liquid crystal element 770. Photodetector 780 detects the luminance of the first portion of laser light and outputs a representative laser light luminance signal. The laser light luminance signal is received by processor 710.

Ambient light sensor 750 senses ambient light and outputs a signal based on ambient light luminance. The ambient light luminance signal is received by processor 710. The location of ambient light sensor 750 is shown inside support structure 701 for exemplary purposes only, and in an actual implementation ambient light sensor 750 would be found on a front, outward facing aspect of support structure 701 (from perspective of the user).

Processor 710 receives laser light luminance and/or ambient light luminance signals and instructs controller 760 to output a signal based on the laser light luminance and/or ambient light luminance signals. The opacity of liquid crystal element 770 is responsive to the signal from controller 760. Modulation of the opacity of liquid crystal element 770 by controller 760 results in appropriate attenuation of the second portion of laser light. As in FIGS. 1 and 3, the attenuation factor of the liquid crystal element for the visible laser light is greater than the attenuation factor of the liquid crystal element for infrared light. The signal from controller 760 may include an alterable property of an electric or magnetic field created by controller 760, although a person of skill in the art will appreciate that alternative factors can influence the opacity of the liquid crystal element.

A person of skill in the art will appreciate that the teachings of the present systems, methods, and devices may be modified and/or applied in additional applications beyond the specific WHUD implementations described herein. For example, some applications may include one or more luminance attenuator(s) that employ an alternative tunable opacity technology, such as one or more laser shutter(s), instead of or in addition to a liquid crystal element. Similarly, one or more element(s) of tunable opacity (liquid crystal or otherwise) may be incorporated into the optical path(s) in other display systems beyond the scanning laser-based WHUDs described herein, such as in alternative WHUD architectures or in non-wearable displays.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. Nos. 14/155,087, 14/155,107, PCT Patent Application PCT/US2014/057029, and/or U.S. Provisional Patent Application Ser. No. 62/236,060, all of which are incorporated by reference herein in their entirety.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/675,373, US Patent Publication No. 2015-0378161 A1, U.S. Non-Provisional patent application Ser. Nos. 15/046,234, 15/046,254, 15/046,269, U.S. Provisional Patent Application Ser. No. 62/374,181, U.S. Provisional Patent Application Ser. No. 62/156,736, U.S. Provisional Patent Application Ser. No. 62/214,600, U.S. Provisional Patent Application Ser. No. 62/167,767, U.S. Provisional Patent Application Ser. No. 62/271,135, U.S. Provisional Patent Application Ser. No. 62/245,792, U.S. Non-Provisional patent application Ser. Nos. 14/155,087, 14/155,107, PCT Patent Application PCT/US2014/057029, and/or U.S. Provisional Patent Application Ser. No. 62/236,060, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display ("WHUD") comprising:
a support structure worn on a head of a user;
a laser projector carried by the support structure, the laser projector comprising:
at least one laser diode to provide a laser light; and
at least one scan mirror positioned to receive the laser light from the at least one diode and controllably orientable to redirect the laser light over a range of angles;
a liquid crystal element positioned in an optical path of the laser light between the at least one laser diode and the at least one scan mirror;
a controller communicatively coupled to the liquid crystal element, wherein an opacity of the liquid crystal element is modulatable in response to signals from the controller and wherein the laser light is attenuated in response to the modulated opacity of the liquid crystal element; and
a transparent combiner carried by the support structure and positioned within a field of view of the user, the transparent combiner to direct the laser light from an output of the laser projector into the field of view of the user.

2. The WHUD of claim 1 wherein:
the at least one laser diode includes a red laser diode to provide a red laser light, a green laser diode to provide a green laser light, and a blue laser diode to provide a blue laser light;
the laser projector further comprises a beam combiner to combine the red laser light, the green laser light, and the blue laser light into a single aggregate beam; and
the opacity of the liquid crystal element that is modulatable in response to signals from the controller is at least partially dependent on a wavelength of the laser light incident thereon.

3. The WHUD of claim 2 wherein the at least one laser diode further includes an infrared laser diode to provide an infrared laser light, the beam combiner positioned and oriented to combine the infrared laser light into the single aggregate beam.

4. The WHUD of claim 3 wherein the opacity of the liquid crystal element that is modulatable in response to signals from the controller is modulatable with respect to the red laser light, the green laser light, and the blue laser light up to a first attenuation factor and modulatable with respect to the infrared laser light up to a second attenuation factor, wherein the first attenuation factor greater than the second attenuation factor.

5. The WHUD of claim 1, further comprising:
an ambient light sensor communicatively coupled to the controller, the ambient light sensor positioned and oriented to sense a luminance of light in an ambient environment and communicatively coupled to provide an ambient light luminance signal to the controller in response thereto.

6. The WHUD of claim 5, further comprising:

a processor communicatively coupled to receive the ambient light luminance signal from the ambient light sensor and communicatively coupled to instruct the controller to modulate the liquid crystal element based on the ambient light luminance signal.

7. The WHUD of claim 5, further comprising:

a photodetector positioned and oriented to sense a luminance of the laser light provided by the at least one laser diode and communicatively coupled to provide a laser light luminance signal in response thereto;

a beam splitter positioned and oriented to direct a first portion of the laser light from the at least one laser diode along a first optical path towards the photodetector and a second portion of the laser light from the at least one laser diode along a second optical path through the liquid crystal element towards the scan mirror; and a processor communicatively coupled to receive the laser light luminance signal from the photodetector and communicatively coupled to instruct the controller to modulate the liquid crystal element based on the laser light luminance signal.

8. The WHUD of claim 1, further comprising:

at least one processor communicatively coupled to the controller; and a non-transitory processor-readable storage medium communicatively coupled to the processor, wherein the non-transitory processor-readable storage medium stores processor-executable data and/or instructions that, when executed by the processor, cause the processor to instruct the controller to modulate the liquid crystal element based on input from a user of the laser projector.

* * * * *